(12) United States Patent
Feldtkeller

(10) Patent No.: US 6,411,119 B1
(45) Date of Patent: Jun. 25, 2002

(54) SWITCHED-MODE POWER SUPPLY AND METHOD FOR DETERMINING THE SUPPLY VOLTAGE IN A SWITCHED-MODE POWER SUPPLY

(75) Inventor: Martin Feldtkeller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/549,277

(22) Filed: Apr. 14, 2000

(30) Foreign Application Priority Data

Apr. 14, 1999 (DE) .......................... 199 16 915

(51) Int. Cl.[7] .............................. G01R 31/36
(52) U.S. Cl. ...................... 324/771; 363/21.1
(58) Field of Search ............... 324/118, 119, 324/120, 123 R, 123 C, 771; 363/15, 18, 19, 20, 21.1, 26, 56, 97, 131

(56) References Cited

U.S. PATENT DOCUMENTS

| | | | | |
|---|---|---|---|---|
| 5,475,579 A | * | 12/1995 | John et al. | 363/21 |
| 5,801,534 A | * | 9/1998 | Hohner et al. | 324/399 |
| 5,831,837 A | * | 11/1998 | Coyne et al. | 363/21 |
| 5,933,334 A | * | 8/1999 | Sula | 363/21 |
| 6,016,260 A | * | 1/2000 | Heeringa | 363/21 |

* cited by examiner

*Primary Examiner*—Ernest Karlsen
*Assistant Examiner*—Minh N. Tang
(74) *Attorney, Agent, or Firm*—Laurence A. Greenberg; Werner H. Stemer; Ralph E. Locher

(57) ABSTRACT

A switched-mode power supply has a switch for a pulsed application of a variable supply voltage to a primary coil of a transformer. The power supply has a first current measuring configuration for providing a current measurement signal that is dependent on a current through the primary coil. An evaluation circuit, which is connected to the first current measuring configuration, evaluates a time characteristic of the current and/or of the current measurement signal and is provided for the purpose of determining a value of the supply voltage. A method for determining the value of the supply voltage in the switched-mode power supply by evaluating the time characteristic of the current through the primary coil is also disclosed.

15 Claims, 4 Drawing Sheets

SWITCHED-MODE POWER SUPPLY AND METHOD FOR DETERMINING THE SUPPLY VOLTAGE IN A SWITCHED-MODE POWER SUPPLY

BACKGROUND OF THE INVENTION

Field of the Invention

The present invention relates to a switched-mode power supply having a switch for the pulsed application of a variable supply voltage to a primary coil of a transformer and having a first current measuring configuration for providing a current measurement signal dependent on a current through the primary coil.

Switched-mode power supplies of this type generate from the supply voltage one or more stabilized DC voltages for supplying loads connected to a secondary side of the transformer. The supply voltage is generated from an AC mains voltage by rectification and smoothing, the switched-mode power supplies being configured to function over a wide mains voltage range, e.g. 90V . . . 270V. In the event of a supply voltage produced from a mains voltage which is below the configuration range, the regulating behavior is impaired and there is the risk of the power supply being severely heated. The same applies if the mains voltage supply is interrupted with the power supply being connected. In that case there is still a slowly decreasing supply voltage present across a capacitor that is used to smooth the mains voltage, as a result of which the effects mentioned, poor regulating behavior and imminent heating, are likewise brought about.

In order to measure the supply voltage, known power supplies are provided with a voltage divider, which divides the supply voltage down to a few volts, and a comparator is provided for comparing the divided-down voltage with a reference value. For reasons of fire protection, the voltage divider must be constructed from three resistors, two of which must be resistant to high voltages. The result of the comparison has to be fed to a control circuit of the switched-mode power supply, the control circuit usually being accommodated as an integrated circuit in an IC housing, for which one connection pin of the IC housing is "used up". Furthermore, the external components of the voltage divider, that is to say the components situated outside the control circuit, constitute a cost factor. Moreover, the voltage divider consumes a not inconsiderable power serving only for measurement purposes.

SUMMARY OF THE INVENTION

It is accordingly an object of the invention to provide a switched-mode power supply and a method for determining the supply voltage in a switched-mode power supply that overcome the above-mentioned disadvantages of the prior art devices and methods of this general type.

With the foregoing and other objects in view there is provided, in accordance with the invention, a switched-mode power supply, including:

a transformer having a primary coil;

a switch for providing a pulsed application of a variable supply voltage to the primary coil of the transformer;

a current measuring configuration providing a current measurement signal dependent on a current through the primary coil; and an evaluation circuit connected to the current measuring configuration, the evaluation circuit evaluating a time characteristic of at least one of the current through the primary coil and the current measurement signal and the evaluation circuit determining a value of the variable supply voltage.

According to the invention, the evaluation circuit, which is connected to the current measuring configuration, evaluates the time characteristic of the current through the primary coil and/or of the current measurement signal. The evaluation circuit is provided for the purpose of determining the supply voltage and has an output terminal at which a signal dependent on the supply voltage can be tapped off. In this case, the invention makes use of the fact that after the switch has closed, the characteristic, in particular the rise with respect to time, of the current through the primary coil is dependent on the supply voltage. Shortly after the switch has closed, the current rises approximately linearly in a manner dependent on the supply voltage and the inductance of the primary coil. The evaluation circuit assesses this rise and generates an output signal which is dependent on the gradient of the current signal, and hence on the supply voltage. The evaluating circuit can be completely integrated in a control circuit without external components. The current measurement signal fed to the evaluation circuit for the purpose of determining the current rise is usually fed to the control circuit of a switched-mode power supply in any case for the purpose of generating a drive signal for the semiconductor switch. Therefore an additional connection pin is not necessary either.

One embodiment of the invention provides for the evaluation circuit to have a switching device, for providing a signal dependent on a gradient of the current measurement signal. In addition to the constant conductance of the primary coil and, if appropriate, resistors connected into the primary current circuit, this signal is dependent on the supply voltage and thus represents a measurement signal for the supply voltage.

In accordance with a further embodiment, provision is additionally made of the switching device to compare the signal dependent on the gradient of the current measurement signal with a reference signal. In this case, a two-value signal is preferably available as the output signal, said two-value signal assuming one of the two values depending on whether the supply voltage exceeds or falls below a predetermined value. The evaluation circuit thus serves for identifying an excessively low supply voltage.

One embodiment of the invention provides for the evaluation circuit to have a series circuit formed by a further current measuring configuration and a capacitance element. The series circuit being connected to the current measuring configuration in such a way that a voltage representing the current measurement signal is present across the series circuit. For generating the current measurement signal, the first current measuring configuration preferably has a resistor connected in series with the primary coil. If the current through the primary coil rises after the switch has closed, the voltage across the resistor and across the series circuit formed by the second current measuring configuration and the capacitance element rises proportionally thereto. The rise in this voltage causes a current to flow to the capacitance element, the current flowing to the capacitance element being proportional to the derivative of the voltage characteristic with respect to time. In the case of a linearly rising voltage, the current is constant and, in addition to the constant values of the inductance of the primary coil and of the resistor of the first current measuring configuration, is dependent on the supply voltage. The current is larger, the larger the supply voltage is, that is to say the more steeply the primary current rises.

A further embodiment of the invention provides for a current source to be connected to a node which is common to the capacitance element and the further current measuring configuration, and to evaluate the direction of the current flow through the further current measuring configuration for the purpose of assessing the supply voltage. In this case, the current direction is dependent on the gradient of the current through the primary coil and/or of the current measurement signal. If the current supplied by the current source is smaller than a current which flows to the capacitance element on account of the rise in voltage across the series circuit, another current flows from the current measuring configuration via the further current measuring configuration to the capacitance element. If the current supplied by the current source is larger than a current which flows to the capacitance element on account of the rise in voltage across the series circuit, a current flows in the opposite direction from the current source via the further current measuring configuration to the current measuring configuration.

The further current measuring configuration preferably has a resistor, with terminals to which a comparator is connected for the purpose of determining the current direction. One of two different signals is present at an output of the comparator, depending on the direction in which current flows through the resistor. A flip-flop is preferably connected to an output terminal of the comparator, for storing a signal present at an output at the comparator according to drive pulses. The drive pulses are preferably provided by a pulse width modulator for the driving of the switch, and ensure that the signal at the output of the comparator is stored each time the switch is opened.

A switch is preferably connected in parallel with the capacitance element, which switch is driven by drive pulses in order to discharge the capacitance element before the closing or after the opening of the switch.

The invention furthermore relates to a method for determining the supply voltage in a switched-mode power supply, the method provides for the evaluation of the time characteristic, in particular the rise, of the current through the primary coil after the semiconductor switch has closed. In accordance with one embodiment, the evaluation is effected by the determination of a gradient of the current measurement signal and by the comparison of the gradient with a reference value.

Other features which are considered as characteristic for the invention are set forth in the appended claims.

Although the invention is illustrated and described herein as embodied in a switched-mode power supply and a method for determining the supply voltage in a switched-mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
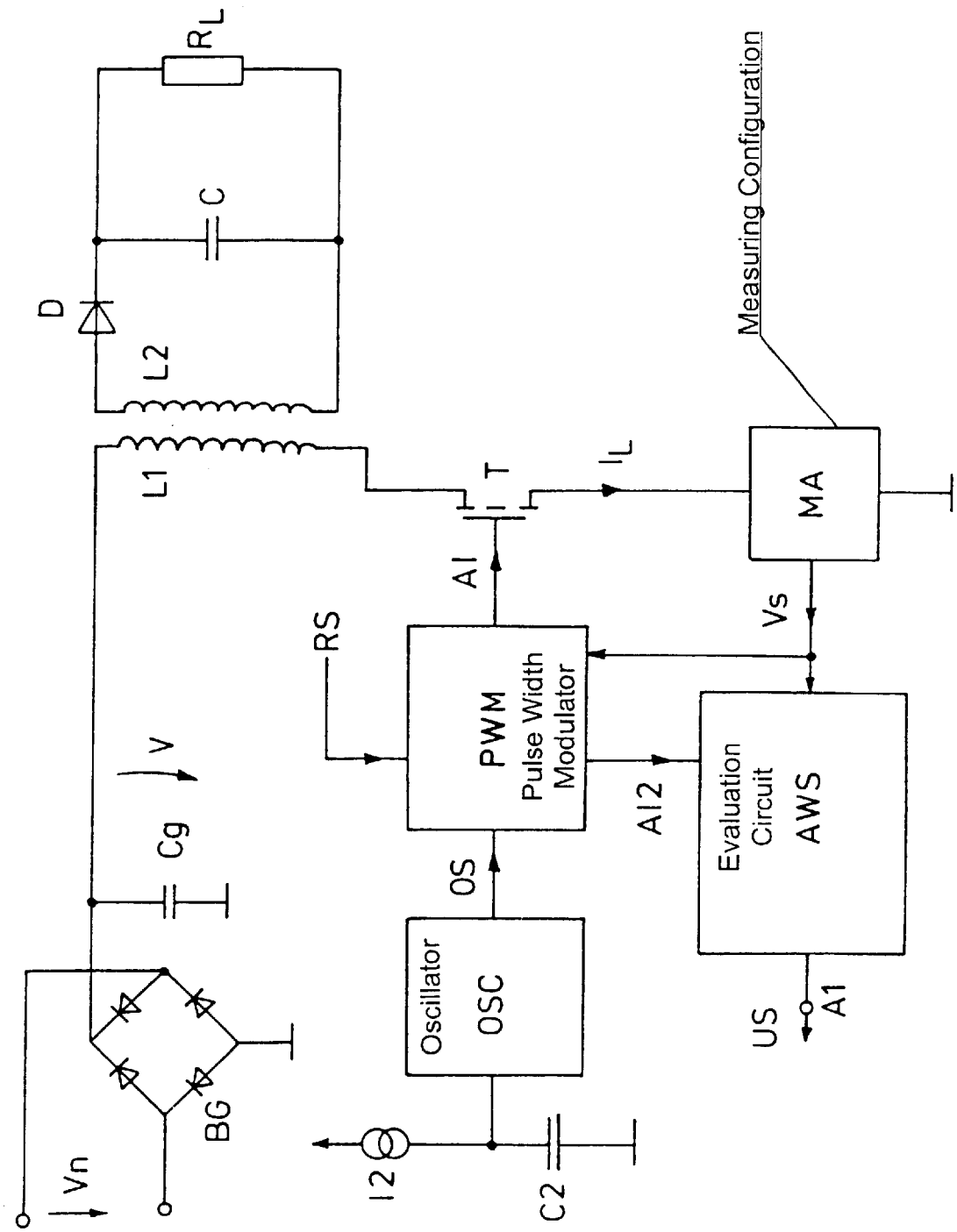
FIG. 1 is a block circuit diagram of one embodiment of a switched-mode power supply according to the invention.

In all the figures of the drawing, sub-features and integral parts that correspond to one another bear the same reference symbol in each case. Referring now to the figures of the drawing in detail and first, particularly, to FIG. 1 thereof, there is shown a switched-mode power supply for supplying a dc voltage to a load $R_L$ connected to output terminals. The switched-mode power supply has a semiconductor switch T, which, for the application of a supply voltage V to a primary coil L1 of a transformer L1, L2 is connected in series with the primary coil L1. The supply voltage V is generated from an AC mains voltage Vn by rectification by a bridge rectifier BG and smoothing by a capacitor Cg. The supply voltage V is available across the capacitor Cg, which is connected in parallel with the series circuit formed by the primary coil L1 and the semiconductor switch T. The primary coil L1 takes up energy when the switch T is closed (conducting), which energy is output to the load via a secondary coil L2 of the transformer L1, L2 and a rectifier D, C after the switch has opened (non-conducting).

Furthermore, a current measuring configuration MA is connected in series with the semiconductor switch T, which current measuring configuration MA serves for measuring a current $I_L$ flowing through the primary coil L1 and at which current measuring configuration MA a current measurement signal Vs dependent on the current $I_L$ is available.

The semiconductor switch T is driven according to a drive signal AI generated by a pulse width modulator PWM in a manner dependent on the current measurement signal Vs, an oscillator signal OS and a load-dependent regulating signal RS. In order to generate the oscillator signal OS, a series circuit formed by a current source I2 and a capacitance element C2 is connected to the oscillator OSC. The pulse width modulator PWM generates drive pulses AI in a known manner, at preferably periodic time intervals, whose respective drive durations vary in a manner dependent on the current measurement signal Vs, the regulating signal RS and the oscillator signal OS, with the result that, in the event of varying loads and/or a varying supply voltage V, a dc voltage present across the load $R_L$ is kept approximately constant. The energy output to the load $R_L$, and hence the dc voltage across the load $R_L$ is dependent on the frequency and the duration of the drive pulses AI.

The switched-mode power supply is intended to function for a wide mains voltage range, e.g. 90V . . . 270V. Since heating of the switched-mode power supply and impairment of the regulating behavior threaten to occur if the predetermined minimum value is undershot, in this case the switched-mode power supply is intended to be switched off, or the semiconductor switch T is intended not to be closed any more.

In order to determine the value of the supply voltage V, an evaluation circuit AWS is provided, which is connected to the current measuring configuration MA for the feeding of the current measurement signal Vs. A signal US dependent on the supply voltage V can be tapped off at an output terminal of the evaluation circuit AWS.

After the switch T has closed, the current $I_L$ through the primary coil L1 rises in an at least approximately constant fashion, a gradient being dependent on the value of the supply voltage V, in addition to the value of the inductance of the primary coil L1. In order to determine the supply voltage V, the gradient of the rise of the current $I_L$ through the primary coil L1 and/or of the current measurement signal Vs dependent thereon is determined in the evaluation circuit AWS.

Figure 2:
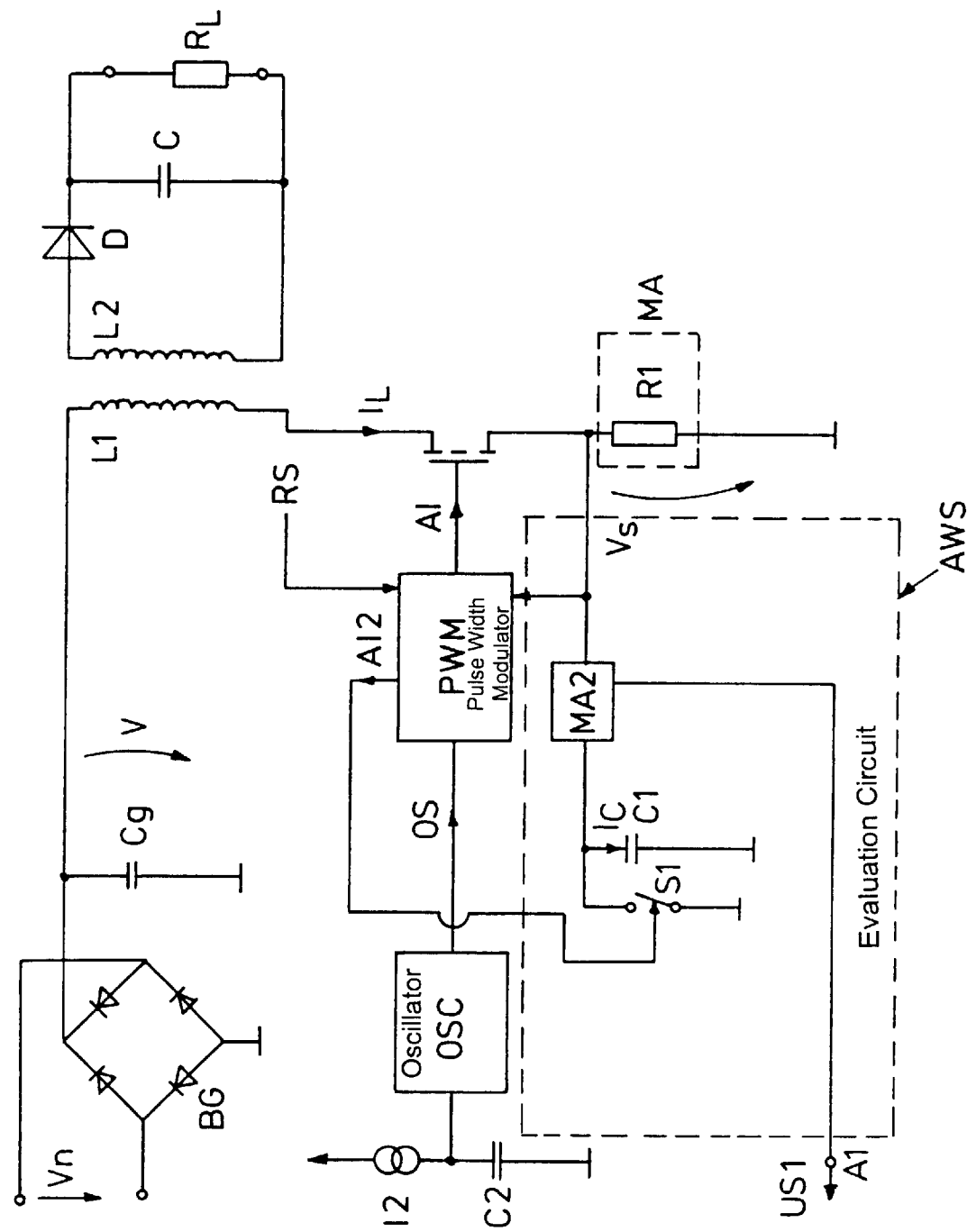
FIG. 2 is a block circuit diagram of the switched-mode power supply with an evaluation circuit in accordance with a first embodiment.

One embodiment of the evaluation circuit AWS of the switched-mode power supply according to the invention is illustrated in detail in FIG. 2.

In this exemplary embodiment, a first current measuring configuration MA is a first resistor R1, which is connected in series with the primary coil L1. In this case, the resistor R1 is dimensioned in such a way that, with a maximum primary current, a predetermined voltage, e.g. 1V, which is significantly lower than the supply voltage is dropped across the resistor R1. The primary current $I_L$ engenders a voltage proportional thereto across the first resistor R1 as the current measurement signal Vs. No primary current $I_L$ flows before the switch T is closed. After the switch T has closed, the voltage Vs rises in an approximately constant fashion, the gradient being proportional to the supply voltage V and to the first resistor R1 and inversely proportional to the inductance of the primary coil L1. The values of the inductance of the primary coil L1 and of the resistor R1 are constant in the switched-mode power supply, so that changes in the gradient of the current measurement signal Vs result exclusively from changes in the supply voltage V and the supply voltage can be determined from the gradient of the current measurement signal Vs.

The determination of the gradient of the current measurement signal Vs is, in mathematical terms, a derivative of the current measurement signal Vs with respect to time. In circuitry terms, the derivative of the current measurement signal Vs is determined by the determination of a current $I_c$ to a first capacitance element C1 connected in parallel with the resistor. The rise in the voltage across the resistor R1 and hence across the capacitance element C1 effects a current to the capacitance element C1, which current, in accordance with the function of a capacitance element, is proportional to the derivative of the voltage characteristic with respect to time. In the case of a constant rise of the voltage Vs, a constant current $I_c$ dependent on the supply voltage V flows. The current $I_c$ flowing to the capacitance element C1 is detected by a second current measuring configuration MA2 connected in series with the capacitance element C1. The signal US dependent on the current $I_c$ and thus on the supply voltage V is available at an output terminal of the second current measuring configuration MA2, which is connected to an output terminal A1 of the evaluation circuit AWS, for further processing, in particular as a decision criterion for possibly switching off the switched-mode power supply in the event of an excessively low supply voltage V.

A switch S1 is connected in parallel with the capacitance element C1, which switch S1 can be driven by second drive pulses AI2, which, in particular, may be identical to the drive pulses AI for the driving of the semiconductor switch T. The switch S1 serves for discharging the capacitance element C1 before the closing or after the opening of the semiconductor switch T, that is to say before a rise in the voltage Vs takes place.

Figure 3:
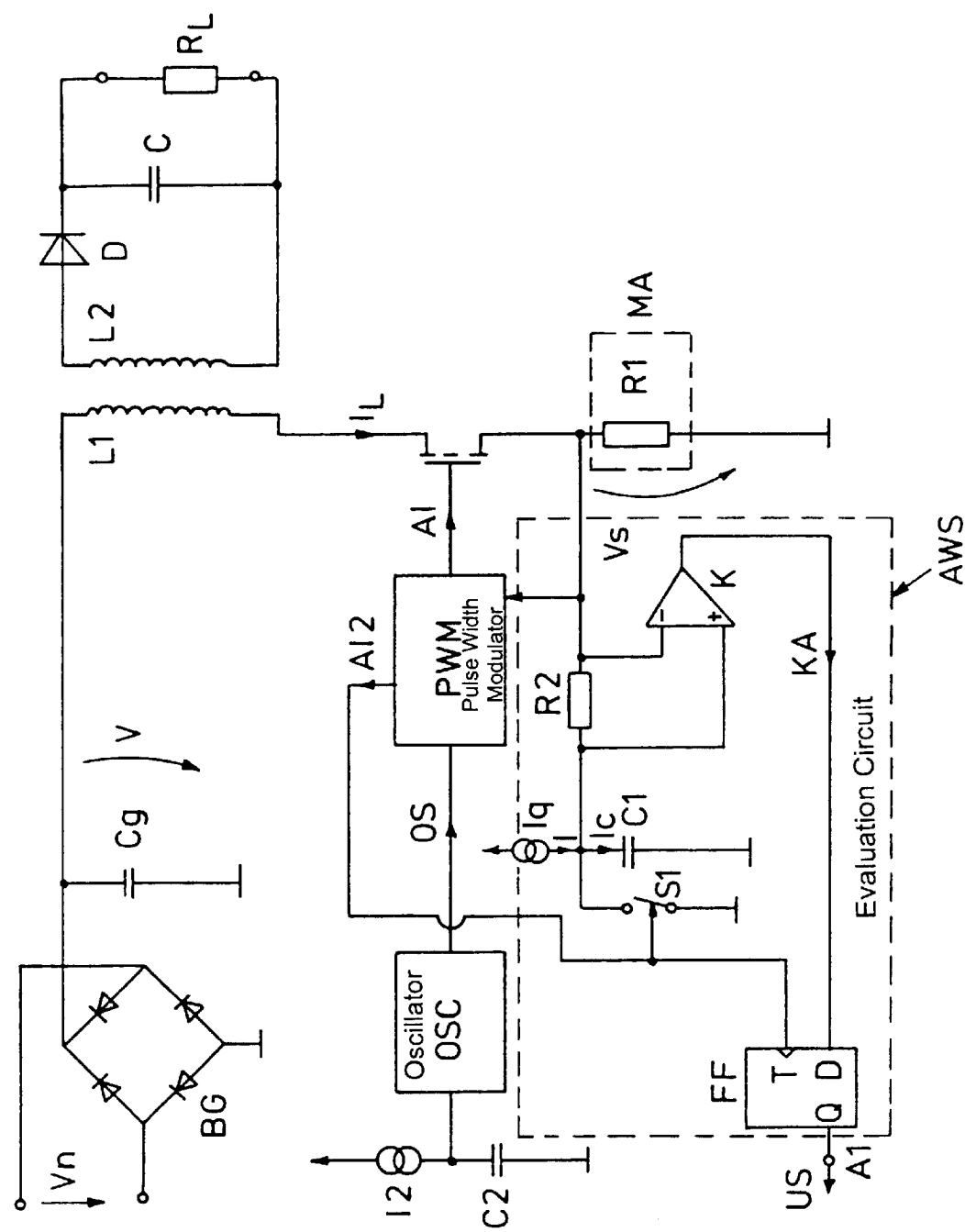
FIG. 3 is a circuit diagram of the switched-mode power supply with the evaluation circuit in accordance with a second embodiment.

FIG. 3 shows a further embodiment of the evaluation circuit AWS, in which the second current measuring configuration MA2 is configured as a second resistor R2 and in which a current source Iq is connected to a node which is common to the second resistor R2 and the capacitance element C1. A comparator K is connected to terminals of the second resistor R2, for providing a signal KA dependent on a direction of a current through the second resistor R2. This current direction is dependent on whether the gradient of the voltage Vs is larger or smaller than a predeterminable value after the semiconductor switch T has closed, that is to say whether the supply voltage V lies above or below a desired value, as is explained below.

The voltage Vs across the first resistor R1 and the series circuit formed by the resistor R2 and the capacitance element C1 rises after the semiconductor switch T has closed. The rise of the voltage effects the current $I_c$ to the capacitance element C1, which current is larger, the more steeply the voltage Vs rises. If the current $I_c$ to the capacitance element is larger than a current made available by the current source I, a current flows via the second resistor R2 to the capacitance element C1. With the comparator K being wired up in the manner illustrated, an non-inverting input of the comparator K is connected to the node which is common to the second resistor R2 and the capacitance element C1, the signal KA at the output of the comparator K assumes a negative value. If, in the event of a slow rise of the voltage Vs, the current $I_c$ to the capacitance element C1 is smaller than the current I made available by the current source Iq, part of the current of the current source Iq flows via the second resistor R2 and the resistor R1 to reference-ground potential. The signal KA assumes a positive value.

The current made available by the current source I serves as a reference signal with which the gradient of the voltage Vs is compared, and which is used to establish the gradient or supply voltage V for which the threshold lies between a positive or negative signal KA.

In the evaluation circuit illustrated in FIG. 3, furthermore, a storage unit connected to the output terminal of the comparator K is connected in the form of a D flip-flop FF. The second drive pulses AI2 are fed to a clock input of the flip-flop FF in order to store the signal KA each time the semiconductor switch T is opened, and to make it available until the next storage operation as the output signal US of the evaluation circuit AWS at an output Q. The output signal US of the D flip-flop FF can be used, in particular, for switching off the switched-mode power supply when the minimum permissible supply voltage is undershot.

Figure 4:
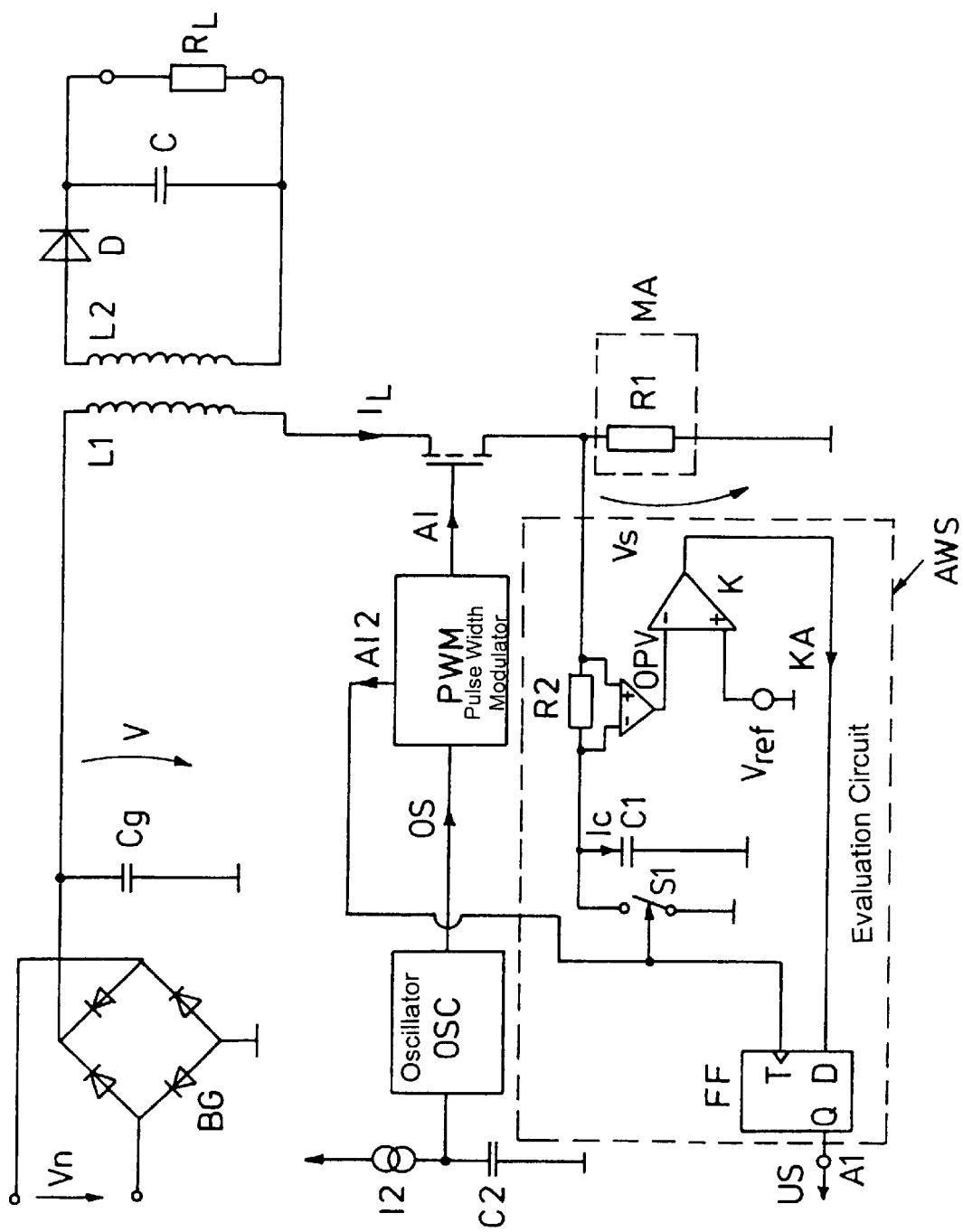
FIG. 4 is a block circuit diagram of the switched-mode power supply with the evaluation circuit in accordance with a third embodiment.

FIG. 4 shows a further embodiment of the evaluation circuit AWS, in which an operational amplifier OPV is connected to the terminals of the second resistor R2. An output terminal of the operational amplifier OPV is connected to an input terminal of the comparator K and a reference voltage source $V_{ref}$ is connected to a second input terminal of the comparator K. A voltage signal dependent on the current $I_c$ and hence on the supply voltage V is available at the output of the comparator K. The output signal of the comparator K assumes one of two values depending on whether the output signal of the operational amplifier OPV is larger or small than the reference value $V_{ref}$, that is to say whether the supply voltage V is larger or smaller than a desired value.

The time constant formed from the resistor R2 and the capacitance element C1 is preferably chosen such that it is significantly smaller than the maximum switched-on duration of the semiconductor switch T. The identification of an excessively low supply voltage also still functions correctly when the switched-mode power supply operates in the trapezoidal current mode, that is to say when the current—after the semiconductor switch has closed—first of all rises abruptly and then slowly rises further.

A non-illustrated amplifier is advantageously inserted between the output terminal of the current measuring configuration R1 and the resistor R2. The capacitance of the capacitor can then be reduced by the gain factor.

Furthermore, it is advantageous for the switch S1 not to be opened until shortly after the semiconductor switch T has closed. In that case, during the assessment of the supply voltage V by the evaluation circuit AWS, no disturbances can occur as a result of current spikes during the switching on of the semiconductor switch T, as occur in particular with power MOSFETs.

The switched-mode power supply according to the invention enables a method for determining the supply voltage V to be carried out, the rise of the current through the primary coil L1 is assessed, in particular being compared with a reference signal, for this purpose.

I claim:

1. A switched-mode power supply, comprising:
   a transformer having a primary coil;
   a switch for providing a pulsed application of a variable supply voltage to said primary coil of said transformer;
   a current measuring configuration providing a current measurement signal dependent on a current through said primary coil; and
   an evaluation circuit connected to said current measuring configuration, said evaluation circuit determining a value of the variable supply voltage by evaluating a time characteristic of at least one of the current through said primary coil and the current measurement signal.

2. The switched-mode power supply according to claim 1, wherein said evaluation circuit has an output terminal at which a signal dependent on the variable supply voltage can be tapped off.

3. The switched-mode power supply according to claim 1, wherein said evaluation circuit has a switching unit for providing a signal dependent on a gradient of the current measurement signal.

4. The switched-mode power supply according to claim 1, wherein said evaluation circuit has a switching unit with a comparator for providing a signal dependent on a gradient of the current measurement signal and for comparing the signal with a reference signal.

5. The switched-mode power supply according to claim 1, wherein said evaluation circuit has a series circuit formed by a further current measuring configuration and a capacitance element, said series circuit being connected to said current measuring configuration.

6. The switched-mode power supply according to claim 5, including a current source connected to a node that is common to said further current measuring configuration and said capacitance element.

7. The switched-mode power supply according to claim 6, wherein said further current-measuring configuration has a resistor with connecting terminals.

8. The switched-mode power supply according to claim 7, including a comparator connected to said connecting terminals of said resistor.

9. The switched-mode power supply according to claim 7, including:
   a comparator having connecting terminals and an output terminal, one of said connecting terminals of said comparator receiving a reference voltage source; and
   an operational amplifier connected to said connecting terminals of said resistor and having an output terminal connected to another of said connecting terminals of said comparator.

10. The switched-mode power supply according to claim 1, wherein said evaluation circuit has a capacitive element and a switch connected in parallel with said capacitance element, said switch of said evaluation circuit receiving and being driven by drive pulses.

11. The switched-mode power supply according to claim 9, including a storage element connected downstream of said comparator, said storage element storing a signal present at said output terminal of said comparator and said storage element receiving and driven by drive pulses.

12. The switched-mode power supply according to claim 1, wherein said current measuring configuration has a resistor connected in series with said primary coil.

13. A method for assessing a variable supply voltage of a switched-mode power supply having a semiconductor switch for providing a pulsed application of the variable supply voltage to a primary coil of a transformer and a current measuring configuration for measuring a current through the primary coil, which comprises:
   determining a value of the variable supply voltage by evaluating a time characteristic of at least one of the current through the primary coil and a current measurement signal provided by the current measuring configuration.

14. The method according to claim 13, which comprises determining a gradient of at least one of the current and the current measurement signal during the evaluating step.

15. The method according to claim 14, which comprises comparing the gradient with a reference signal.

* * * * *